(12) United States Patent
Imai

(10) Patent No.: US 11,532,434 B2
(45) Date of Patent: Dec. 20, 2022

(54) CERAMIC ELECTRONIC DEVICE, MOUNTING SUBSTRATE, PACKAGE BODY OF CERAMIC ELECTRONIC DEVICE, AND MANUFACTURING METHOD OF CERAMIC ELECTRONIC DEVICE

(71) Applicant: TAIYO YUDEN CO., LTD., Tokyo (JP)

(72) Inventor: Atsushi Imai, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 386 days.

(21) Appl. No.: 16/796,162

(22) Filed: Feb. 20, 2020

(65) Prior Publication Data
US 2020/0273619 A1 Aug. 27, 2020

(30) Foreign Application Priority Data
Feb. 25, 2019 (JP) .............................. JP2019-031800

(51) Int. Cl.
*H01G 4/012* (2006.01)
*H01G 4/30* (2006.01)
*H01G 4/12* (2006.01)

(52) U.S. Cl.
CPC ........... *H01G 4/012* (2013.01); *H01G 4/1209* (2013.01); *H01G 4/1227* (2013.01);
(Continued)

(58) Field of Classification Search
CPC ........ H01G 2/065; H01G 4/005; H01G 4/012; H01G 4/1209; H01G 4/1227;
(Continued)

(56) References Cited

U.S. PATENT DOCUMENTS 9,368,280 B2 * 6/2016 Park ........................ H01G 4/30
9,640,323 B2 * 5/2017 Sugita ...................... H01G 4/38
(Continued)

FOREIGN PATENT DOCUMENTS

CN 108735508 A1 11/2018
CN 109285698 A1 1/2019
(Continued)

OTHER PUBLICATIONS

Chinese Office Action dated Jun. 1, 2022 in a counterpart Chinese patent application No. 202010114900.4. (A machine translation (not reviewed for accuracy) attached.).

*Primary Examiner* — Nathan Milakovich
(74) *Attorney, Agent, or Firm* — Chen Yoshimura LLP

(57) ABSTRACT

A ceramic electronic device includes: a multilayer chip having a multilayer structure and a cover layer, the multilayer structure having a structure in which each of dielectric layers and each of internal electrode layers are alternately stacked, respective one ends of the plurality of internal electrode layers being alternately exposed to a first end face and a second end face of the multilayer structure, the cover layer being provided on each of an upper face and a lower face of the multilayer structure in a stacking direction of the multilayer structure, a main component of the cover layer being ceramic, wherein in each of two side faces of the multiplayer structure, a color of a first region is different from a color of a second region that is positioned at a height different from the first region in the stacking direction.

13 Claims, 10 Drawing Sheets

(52) U.S. Cl.
CPC ......... *H01G 4/1236* (2013.01); *H01G 4/1245* (2013.01); *H01G 4/30* (2013.01)

(58) Field of Classification Search
CPC .... H01G 4/1236; H01G 4/1245; H01G 4/232; H01G 4/30; H01G 13/00; H05K 1/18
See application file for complete search history.

(56) References Cited

U.S. PATENT DOCUMENTS

| | | | |
|---|---|---|---|
| 10,332,685 B2 * | 6/2019 | Kim | H01G 4/30 |
| 2013/0319741 A1 | 12/2013 | Ahn et al. | |
| 2014/0083755 A1 | 3/2014 | Lee et al. | |
| 2015/0062775 A1 * | 3/2015 | Shibasaki | H01G 4/012 |
| | | | 361/301.4 |
| 2015/0075854 A1 * | 3/2015 | You | H01G 4/35 |
| | | | 361/275.1 |
| 2016/0189868 A1 | 6/2016 | Sasaki et al. | |
| 2018/0301282 A1 | 10/2018 | Nishikawa et al. | |
| 2019/0027311 A1 | 1/2019 | Chigira | |

FOREIGN PATENT DOCUMENTS

| | | | |
|---|---|---|---|
| JP | 2013-251522 A | 12/2013 | |
| JP | 2014-072515 A | 4/2014 | |
| JP | 2016-127045 A | 7/2016 | |
| WO | WO-2018124535 A1 * | 7/2018 | H01G 4/012 |

* cited by examiner

CERAMIC ELECTRONIC DEVICE, MOUNTING SUBSTRATE, PACKAGE BODY OF CERAMIC ELECTRONIC DEVICE, AND MANUFACTURING METHOD OF CERAMIC ELECTRONIC DEVICE

CROSS-REFERENCE TO RELATED APPLICATION

This application is based upon and claims the benefit of priority of the prior Japanese Patent Application Publication No. 2019-031800, filed on Feb. 25, 2019, the entire contents of which are incorporated herein by reference.

FIELD

A certain aspect of the present invention relates to a ceramic electronic device, a mounting substrate, a package body of a ceramic electronic device and a manufacturing method of the ceramic electronic device.

BACKGROUND

When an alternating current voltage is applied to a ceramic electronic device such as a multilayer ceramic capacitor mounted on a mounting substrate, expand and contraction occurs because of electrostriction. Thus, oscillation caused by the expand and contraction is conducted to the mounting substrate. In this case, acoustic noise phenomenon occurs. There is disclosed a technology in which a lower cover layer (a cover layer on the side of the mounting substrate) is thicker than an upper cover layer in a ceramic electronic device, as a method for suppressing the acoustic noise (for example, see Japanese Patent Application Publication No. 2013-251522). Alternatively, there is disclosed a technology in which a low capacity section, in which an interval between internal electrodes is enlarged, is provided on a lower side (on the side of the mounting substrate) of the ceramic electronic device, as a method for suppressing the acoustic noise (for example, see Japanese Patent Application Publication No. 2016-127045).

Up and down of the ceramic electronic device is discriminated and is packed in a package body in order to locate a thick lower cover layer or the low capacity section on the side of the mounting substrate. Alternatively, there is disclosed a technology in which a discriminable layer having a different color is provided on a surface of the lower cover layer (for example, see Japanese Patent Application Publication No. 2014-072515).

SUMMARY OF THE INVENTION

When an individual difference occurs in the color of the discriminable layers in a case where the discriminable layer is provided on the surface of the lower cover layer, it may be difficult whether the lower cover layer is on the side of the mounting substrate, in extracting of the ceramic electronic device from the package body or under a condition after mounting to the mounting substrate.

The present invention has a purpose of providing ceramic electronic device, a mounting substrate, a package body of the ceramic electronic device that can be discriminated and a manufacturing method of the ceramic electronic device.

According to an aspect of the present invention, there is provided a ceramic electronic device including: a multilayer chip having a multilayer structure and a pair of cover layers, the multilayer structure having a structure in which each of a plurality of dielectric layers and each of a plurality of internal electrode layers are alternately stacked, a main component of the dielectric layers being ceramic, the multilayer structure having a rectangular parallelepiped shape, respective one ends of the plurality of internal electrode layers being alternately exposed to a first end face and a second end face of the multilayer structure, the first end face being opposite to the second end face, the pair of cover layers being respectively provided on an upper face and a lower face of the multilayer structure in a stacking direction of the multilayer structure, a main component of the cover layers being ceramic, a first external electrode provided on the first end face; and a second external electrode provided on the second end face, wherein each of two side faces of the multilayer structure has a first region and a second region that are positioned at different heights from each other in the stacking direction, and a color of the first region is different from a color of the second region.

According to another aspect of the present invention, there is provided a mounting substrate including: the above-mentioned ceramic electronic device that is mounted on the mounting substrate, wherein the second region is closer to the mounting substrate than the first region.

According to another aspect of the present invention, there is provided a package body including: the above-mentioned ceramic electronic device provided in a plurality; and a carrier tape having housing portions in which the plurality of the ceramic electronic devices are respectively housed, wherein the ceramic electronic devices are respectively housed in the housing portions so that the respective second regions are positioned at respective biased positions in the housing portions.

According to another aspect of the present invention, there is provided a manufacturing method of a ceramic electronic device including: forming a ceramic multilayer structure in which each of a plurality of green sheets and each of a plurality of metal conductive paste patterns are alternately stacked, the green sheets including ceramic powder, respective one ends of the plurality of metal conductive paste patterns being alternately exposed to a first end face and a second end face of the ceramic multilayer structure; and firing the ceramic multilayer structure, wherein the ceramic multilayer structure includes a first multilayer structure and a second multilayer structure, where each green sheet in the first multilayer structure is thinner than each green sheet in the second multilayer structure, wherein a density of the ceramic powder in each green sheet in the first multilayer structure is larger than a density of the ceramic powder in each green sheet in the second multilayer structure.

According to another aspect of the present invention, there is provided a manufacturing method of a ceramic electronic device comprising: forming a ceramic multilayer structure in which each of a plurality of green sheets and each of a plurality of metal conductive paste patterns are alternately stacked, the green sheets including ceramic powder, respective one ends of the plurality of metal conductive paste patterns being alternately exposed to a first end face and a second end face of the ceramic multilayer structure; and firing the ceramic multilayer structure, wherein the ceramic multilayer structure includes a first multilayer structure and a second multilayer structure, where each green sheet in the first multilayer structure is thinner each green sheet in the second multilayer structure, wherein a concentration of a sintering assistant in each green sheet in the first multilayer structure is larger than a concentration of a sintering assistant in each green sheet in the second multilayer structure.

DETAILED DESCRIPTION

A description will be given of an embodiment with reference to the accompanying drawings.

Embodiment

Figure 1:
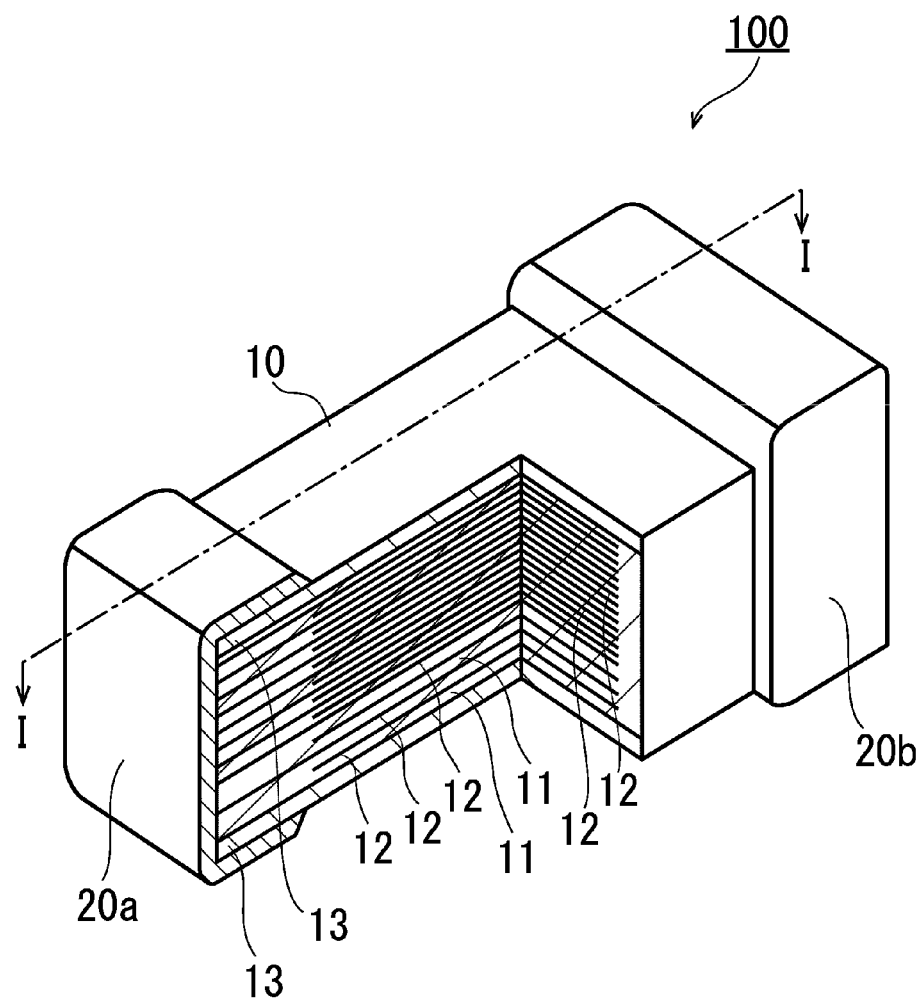
FIG. 1 illustrates a perspective view of a multilayer ceramic capacitor in which a cross section of a part of the multilayer ceramic capacitor is illustrated.

FIG. 1 illustrates a perspective view of a multilayer ceramic capacitor 100 in accordance with an embodiment, in which a cross section of a part of the multilayer ceramic capacitor 100 is illustrated. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, the internal electrode layer 12 is positioned at an outermost layer in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.6 mm, a width of 0.3 mm and a height of 0.4 mm. The multilayer ceramic capacitor 100 may have a length of 1.0 mm, a width of 0.5 mm and a height of 0.6 mm. The multilayer ceramic capacitor 100 may have a length of 1.6 mm, a width of 0.8 mm and a height of 0.9 mm. The multilayer ceramic capacitor 100 may have a length of 2.0 mm, a width of 1.2 mm and a height of 1.4 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

Figure 2:
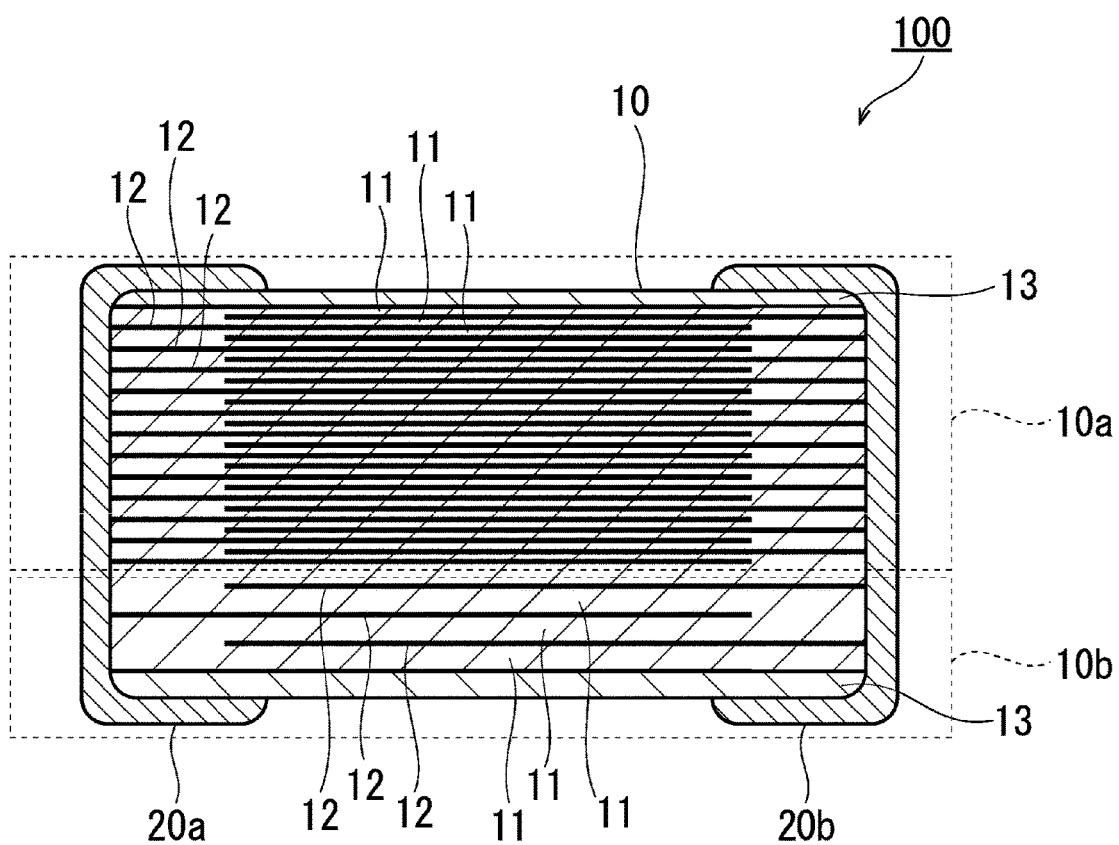
FIG. 2 illustrates a cross sectional view taken along a line I-I of FIG. 1.

FIG. 2 illustrates across sectional view taken along a line I-I of FIG. 1. As illustrated in FIG. 2, the multilayer chip 10 has a high capacity section 10a and a low capacity section 10b of which ranges in the stacking direction are different from each other, in the above-mentioned multilayer structure. The thickness of the dielectric layers 11 in the high capacity section 10a is different from that in the low capacity section 10b. In the embodiment, the thickness of the dielectric layers 11 in the high capacity section 10a is smaller than that in the low capacity section 10b. The thickness of the dielectric layer 11 corresponds to an interval between two of the internal electrode layers 12 sandwiching the dielectric layer 11. When the thickness of the dielectric layers 11 is large, the number of the internal electrode layers 12 per a unit height is reduced. Therefore, an electrostatic capacity $C_1$ of the high capacity section 10a is larger than an electrostatic capacity $C_2$ of the low capacity section 10b.

The thickness of the dielectric layers 11 in the high capacity section 10a and the thickness of the dielectric layers 11 in the low capacity section 10b are not limited. For example, the thickness of the dielectric layers 11 in the high capacity section 10a is 0.6 μm to 2.0 μm. For example, the thickness of the dielectric layers 11 in the high capacity section 10a is 1.5 μm. For example, the thickness of the dielectric layers 11 in the low capacity section 10b is 5.0 μm to 15.0 μm. For example, the thickness of the dielectric layers 11 in the low capacity section 10b is 10.0 μm.

Figure 3:
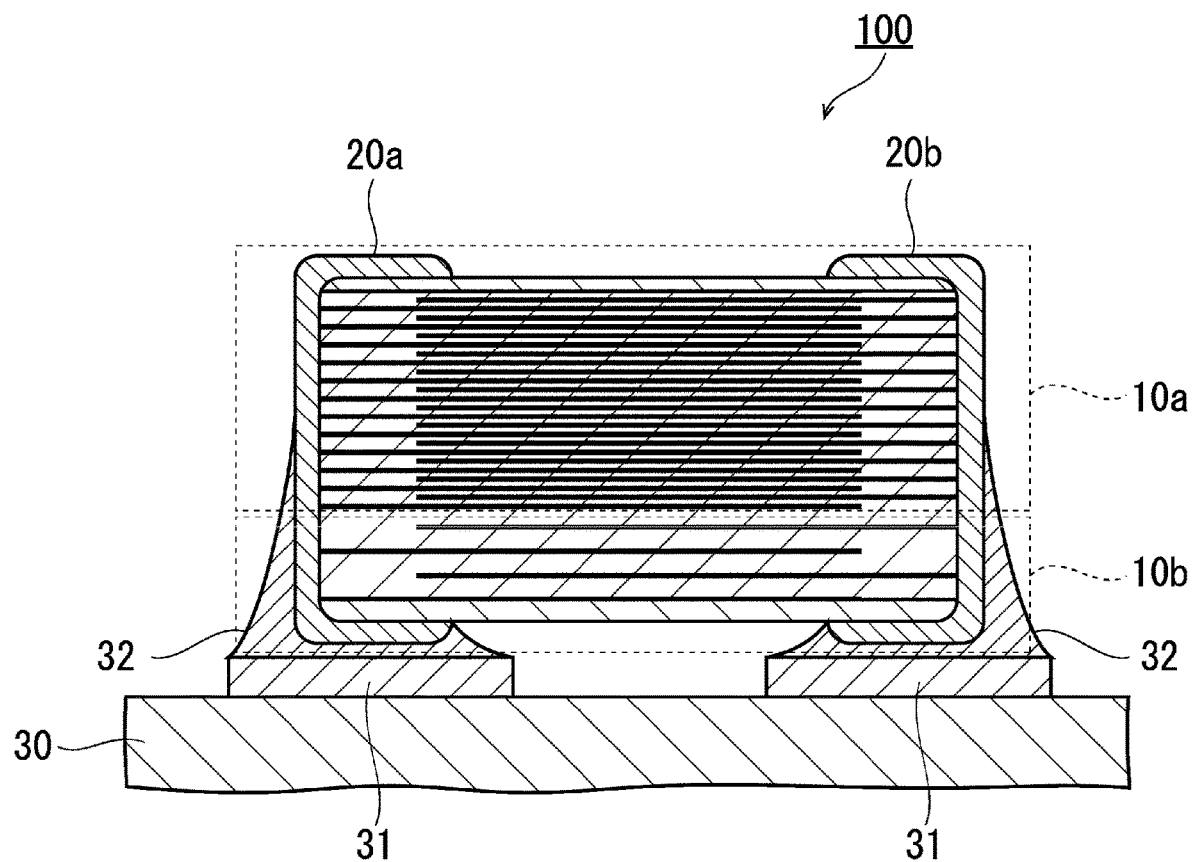
FIG. 3 illustrates a cross sectional view of a mounting substrate on which a multilayer ceramic capacitor is mounted.

FIG. 3 illustrates a cross sectional view of a mounting substrate 30 on which the multilayer ceramic capacitor 100 is mounted. As illustrated in FIG. 3, the multilayer ceramic capacitor 100 is mounted on a wiring layer 31 on the mounting substrate 30. The wiring layer 31 is connected to the external electrodes 20a and 20b via a solder 32. The low capacity section 10b is closer to the mounting substrate than the high capacity section 10a.

Figure 4A:
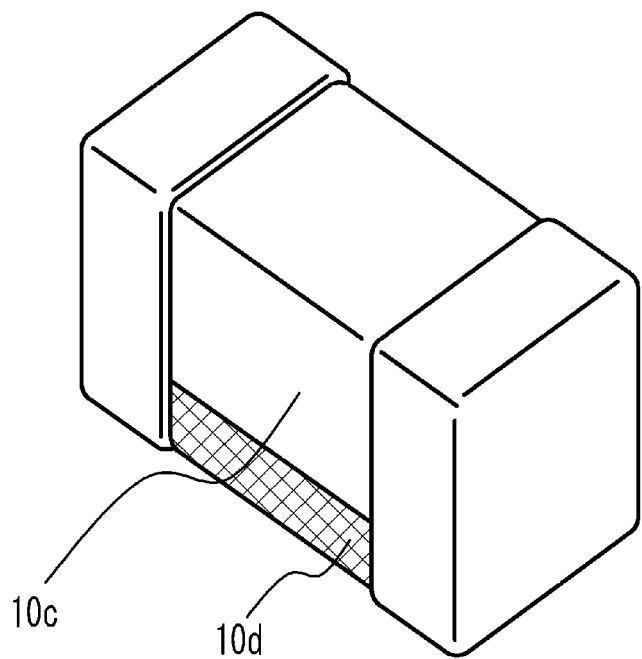
FIG. 4A illustrates a perspective view of a multilayer ceramic capacitor.

In the embodiment, as illustrated in FIG. 4A, in the two side faces of the multilayer structure of the multilayer chip 10, a color of a first region 10c is different from that of a second region 10d that is different from the first region 10c in the stacking direction. The first region 10c corresponds to a side face of the high capacity section 10a. The second region 10d corresponds to a side face of the low capacity section 10b. In FIG. 4A, a mesh pattern is added to the second region 10d. With the structure, it is possible to easily discriminate up and down of the multilayer ceramic capacitor 100. It is therefore possible to easily discriminate the high capacity section 10a in which acoustic noise easily occurs and the low capacity section 10b in which the acoustic noise hardly occurs. Accordingly, it is possible to suppress mounting with a false position. And, the acoustic noise can be suppressed.

Figure 4B:
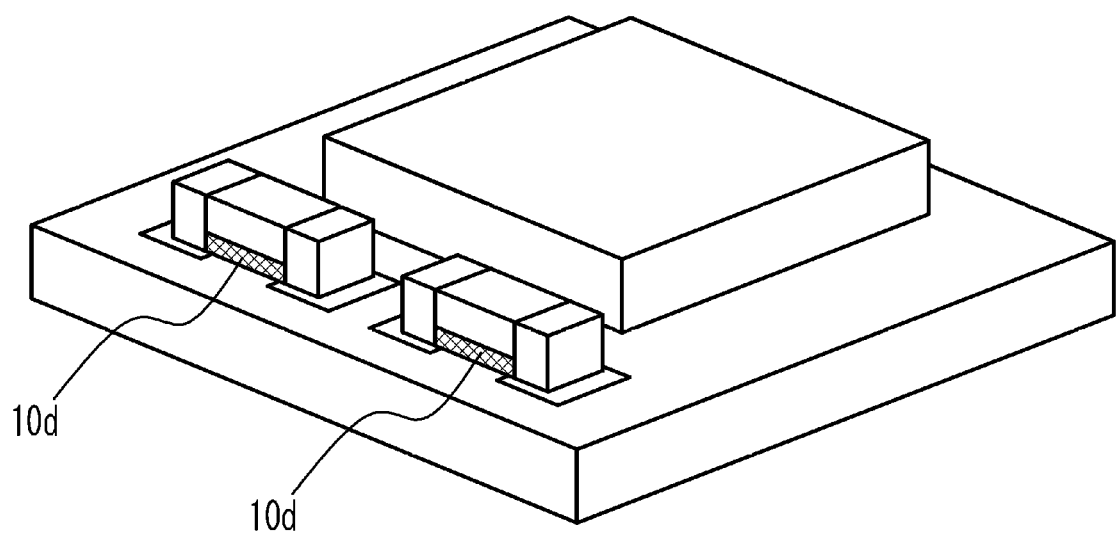
FIG. 4B illustrates a perspective view of a mounting substrate.

As illustrated in FIG. 4B, it is possible to confirm whether the multilayer ceramic capacitor 100 is correctly mounted after the mounting, because it is possible to discriminate the high capacity section 10a and the low capacity section 10b when viewed from the side face of the multilayer structure of the multilayer chip 10. In FIG. 4B, the mesh pattern is added to the second region 10d.

It is possible to form the dielectric layers 11 by firing green sheets including ceramic powder. When a sintering kinetics of the first region 10c during the firing is different from that of the second region 10d, the color of the first region 10c is different from that of the second region 10d. For example, the sintering of the low capacity section 10b delays, the color of the first region 10c is different from that of the second region 10d. For example, when the concentration of the sintering assistant is enlarged, the sintering kinetics is enlarged. When the concentration of the sintering assistant is reduced, the sintering kinetics is reduced.

It is possible to use Mg (magnesium), Mn (manganese), V (vanadium), Si (silicon), B (boron) or the like, as the sintering assistant. For example, when a plurality of element types are used as the sintering assistant, it is preferable that a total concentration of the sintering assistants in the dielectric layers 11 in the high capacity section 10a is larger than that in the dielectric layers 11 in the low capacity section 10b. The concentration of the sintering assistants are atm % on a presumption that a concentration of the B site of the ceramic powder expressed by $ABO_3$ is 100 atm %. In the following description, concentrations of other components are atm % on a presumption that the concentration of the B site of the ceramic powder expressed by $ABO_3$ is 100 atm %.

For example, it is preferable that a Si concentration in the dielectric layers 11 of the high capacity section 10a is different from that of the dielectric layers 11 of the low capacity section 10b. However, when the difference of the Si concentrations is excessively small, it may be difficult to sufficiently delay the sintering of the dielectric layers 11 of the low capacity section 10b. And so, it is preferable that a ratio of the Si concentration in the dielectric layers 11 of the high capacity section 10a with respect to the Si concentration in the dielectric layers 11 of the low capacity section 10b (hereinafter referred to as a Si ratio) has a lower limit. On the other hand, when the Si ratio is excessively high, a crack may occur because of the sintering kinetics difference. And so, it is preferable that the Si ratio has an upper limit. In the embodiment, it is preferable that the Si ratio is 1.5 or more. It is more preferable that the Si ratio is 2.0 or more. It is still more preferable that the Si ratio is 4.0 or more. It is preferable that the Si ratio is 10.0 or less. It is more preferable that the Si ratio is 8.0 or less. It is still more preferable that the Si ratio is 6.0 or less.

When an absolute amount of Si added to the high capacity section 10a is excessively large, an electrostatic capacity of the high capacity section 10a may not be necessarily sufficient. And so, it is preferable that the absolute amount of Si added to the dielectric layers 11 of the high capacity section 10a has an upper limit. In the embodiment, it is preferable that the Si concentration in the dielectric layers 11 of the high capacity section 10a is less than 2.5 atm %. It is more preferable that the Si concentration is 2.4 atm % or less. It is still more preferable that the Si concentration is 2.0 atm % or less. For example, it is preferable that the Si concentration in the dielectric layers 11 of the high capacity section 10a is 0.05 atm % or more and 2.4 atm % or less, and the Si concentration in the dielectric layers 11 of the low capacity section 10b is 0.03 atm % or more and 0.7 atm % or less.

Alternatively, it is possible to enlarge the sintering kinetics by reducing the concentration of the rare earth element. It is possible to reduce the sintering kinetics by enlarging the concentration of the rare earth element. And so, it is preferable that the total concentration of the rare earth element in the dielectric layers 11 of the high capacity section 10a is smaller than that in the dielectric layers 11 of the low capacity section 10b. For example, when Ho (holmium) is used as the rare earth element, it is preferable that a Ho concentration in the dielectric layers 11 of the high capacity section 10a is smaller than that in the dielectric layers 11 of the low capacity section 10b.

Alternatively, when a main component of the dielectric layers 11 is a ceramic material having a perovskite structure expressed by a general formula $ABO_3$, it is possible to enlarge the sintering kinetics by replacing the B site of the perovskite structure and reducing the concentration of the element acting as a donor and it is possible to reduce the sintering kinetics by enlarging the concentration of the element acting as the donor. The element acting as the donor is such as Mo (molybdenum), Nb (niobium), Ta (tantalum), W (tungsten) or the like. And so, when Mo is used as the element acting as the donor, it is preferable that a Mo concentration in the dielectric layers 11 of the high capacity section 10a is smaller than that in the dielectric layer 11 of the low capacity section 10b.

When an occupancy rate of the low capacity section 10b in the multilayer chip 10 is excessively small, it may not be necessarily discriminate the color of the low capacity section 10b. On the other hand, when the occupancy rate of the low capacity section 10b in the multilayer chip 10 is excessively large, the capacity may not be necessarily sufficient. And so, it is preferable that a ratio of the height of the high capacity section 10a with respect to the height of the low capacity section 10b in the stacking direction has an upper limit and a lower limit. For example, it is preferable that the ratio of the height of the high capacity section 10a with respect to the height of the low capacity section 10b is 1.2 or more and 4.0 or less. It is more preferable that the ratio is 1.5 or more and 3.0 or less.

Figure 5:
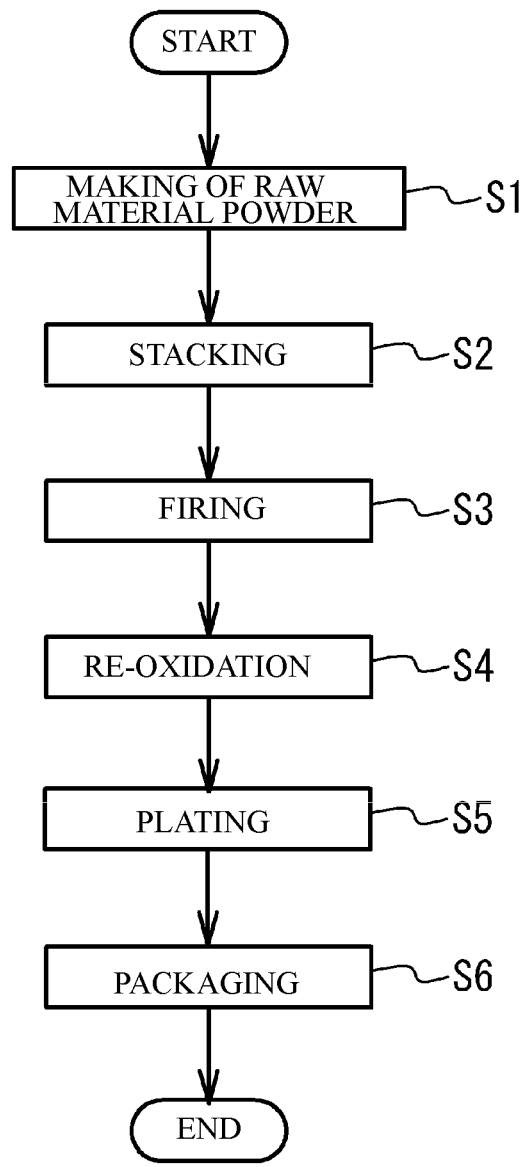
FIG. 5 illustrates a manufacturing method of a multilayer ceramic capacitor.

Next, a description will be given of a manufacturing method of the multilayer ceramic capacitor 100. FIG. 5 illustrates a manufacturing method of the multilayer ceramic capacitor 100.

(Making process of raw material powder) A dielectric material for forming the dielectric layer 11 is prepared. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, $BaTiO_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to resulting ceramic powder, in accordance with purposes. The additive compound may be an oxide of Mo, Nb, Ta, Mg, Mn, V, Cr (chromium) or a rare earth element (Y (yttrium), Sm (samarium), Eu (europium), Gd (gadolinium), Tb (terbium), Dy (dysprosium), Ho, Er (erbium), Tm (thulium) and Yb (ytterbium)), or an oxide of Co (cobalt), Ni, Li (lithium), B (boron), Na (sodium), K (potassium) and Si, or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic powder is 50 nm to 300 nm from a viewpoint of thickness reduction of the dielectric layer 11. The grain diameter may be adjusted by crushing the resulting ceramic powder as needed. Alternatively, the grain diameter of the resulting ceramic power may be adjusted by combining the crushing and classifying.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet is coated on a base material by, for example, a die coater method or a doctor blade method, and then dried.

Next, metal conductive paste for forming an internal electrode is coated on the surface of the dielectric green sheet by screen printing or gravure printing. The metal conductive paste includes an organic binder. Thus, a pattern for forming an internal electrode layer is provided. As co-materials, ceramic particles are added to the metal conductive paste. A main component of the ceramic particles is not limited. However, it is preferable that the main component of the ceramic particles is the same as that of the dielectric layer 11.

Then, the dielectric green sheets are alternately stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to the pair of external electrodes 20a and 20b of different polarizations. For example, a total number of the staked dielectric green sheets is 100 to 500.

Figure 6:
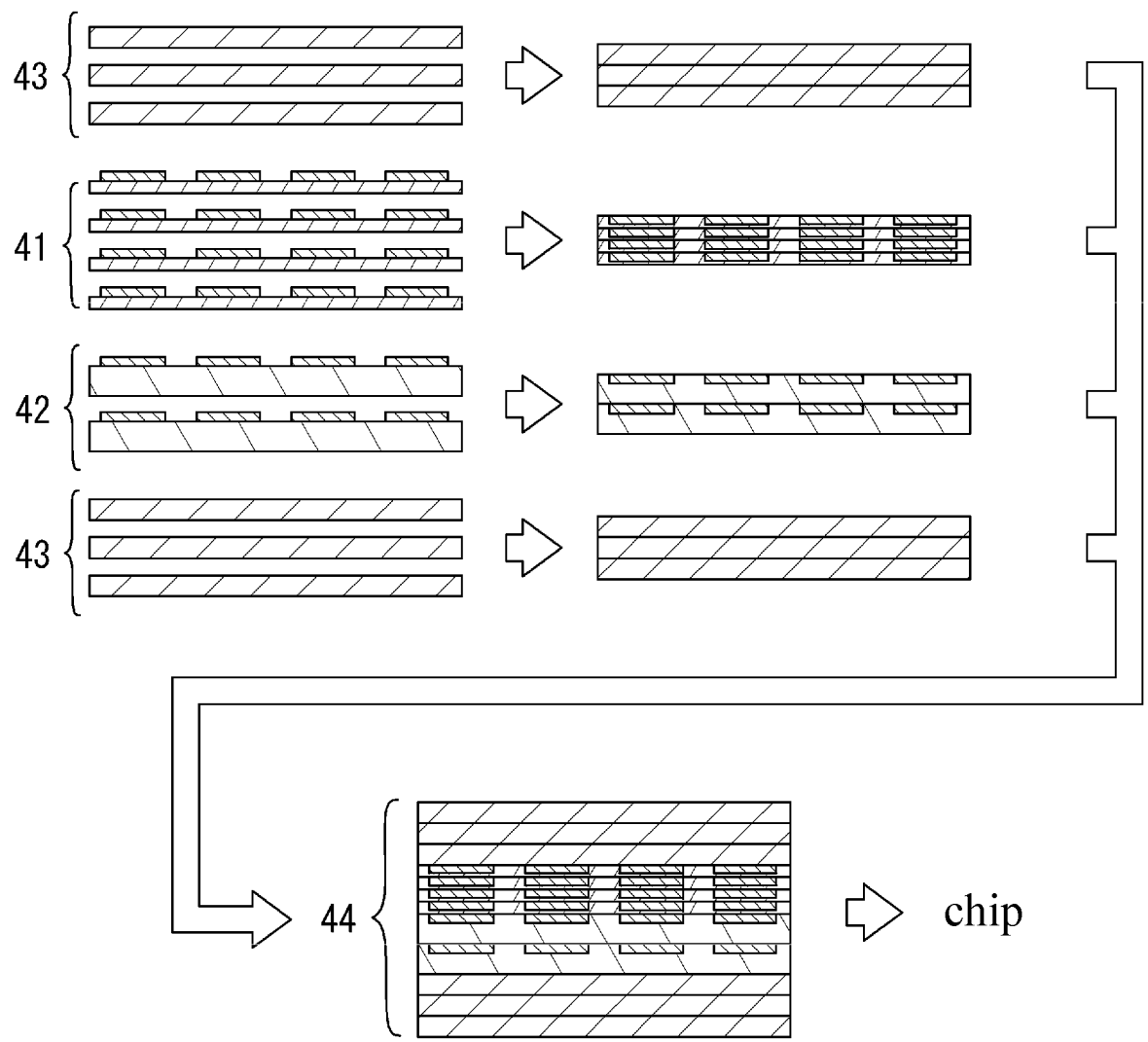
FIG. 6 illustrates a stacking process.

In the stacking process of the dielectric green sheets, a part of the dielectric green sheets corresponding to the high capacity section 10a are stacked as illustrated in FIG. 6. And a resulting first multilayer structure 41 is pressed. Another part of the dielectric green sheets corresponding to the low capacity section 10b are stacked. And a resulting second multilayer structure 42 is pressed. Before the pressing, each dielectric green sheet corresponding the low capacity section 10b is thicker than each dielectric green sheet corresponding to the high capacity section 10a. A pressing force of the first multilayer structure 41 is larger than that of the second multilayer structure 42. Thus, a density of the ceramic powder in the dielectric green sheets of the first multilayer structure 41 is larger than that of the dielectric green sheets of the second multilayer structure 42.

After that, a third multilayer structure 43 of cover sheets to be the cover layer 13 is pressed on the multilayer structure of the dielectric green sheets. And another third multilayer structure 43 of cover sheets to be the cover layer 13 is pressed under the multilayer structure. Thus, a ceramic multilayer structure 44 is obtained. After that, the ceramic multilayer structure 44 is stamped into a predetermined chip size (for example, 1.0 mm×0.5 mm).

(Firing process) Ni paste to be the ground layer of the external electrodes 20a and 20b is coated on the resulting compact by dipping, after removing the binder in $N_2$ atmosphere. And the resulting compact is fired for ten minutes to 2 hours in a reductive atmosphere having an oxygen partial pressure of $10^{-5}$ to $10^{-8}$ atm in a temperature range of 1100 degrees C. to 1300 degrees C. In this manner, the multilayer ceramic capacitor 100 is obtained.

(Re-oxidizing process) After that, a re-oxidizing process may be performed in $N_2$ gas atmosphere in a temperature range of 600 degrees C. to 1000 degrees C.

(Plating process) After that, a metal such as Cu, Ni, Sn or the like may be coated on the external electrodes 20a and 20b by electrolytic plating or the like.

Figure 7A:
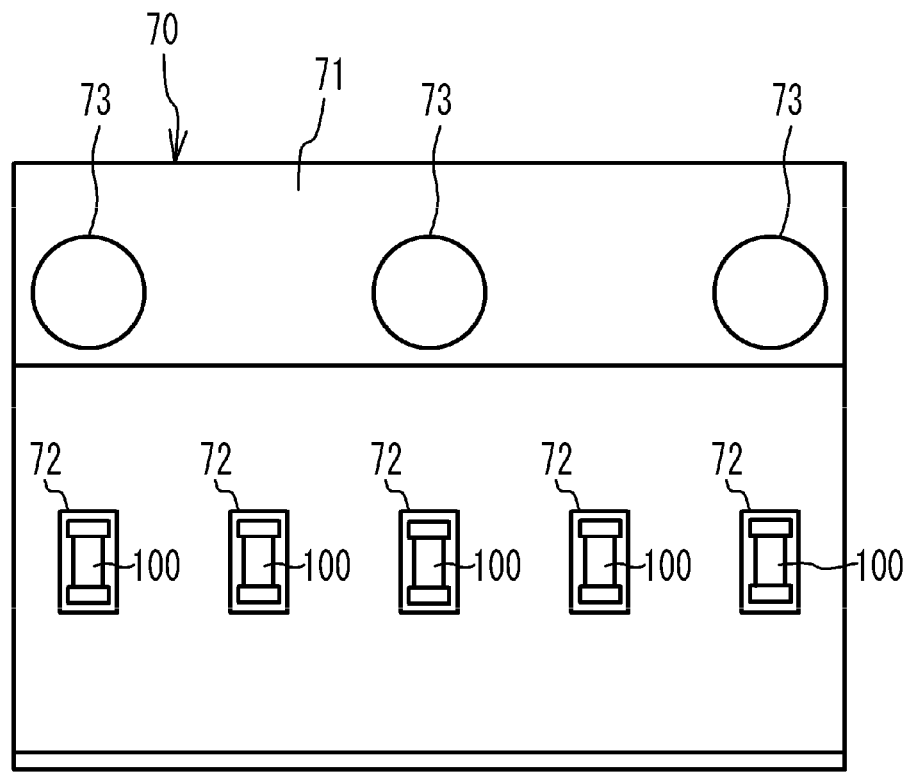
FIG. 7A and FIG. 7B illustrate a package body.
Figure 7B:
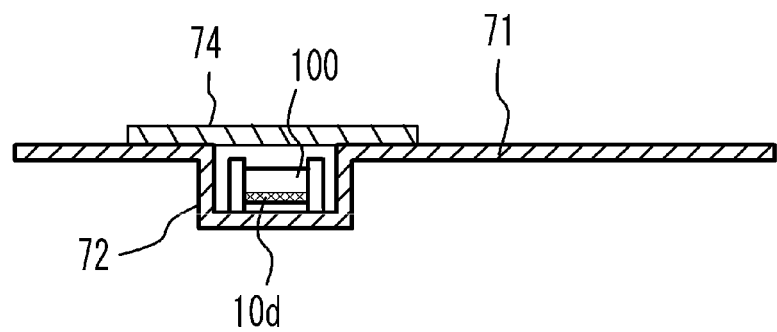
Figure 8:
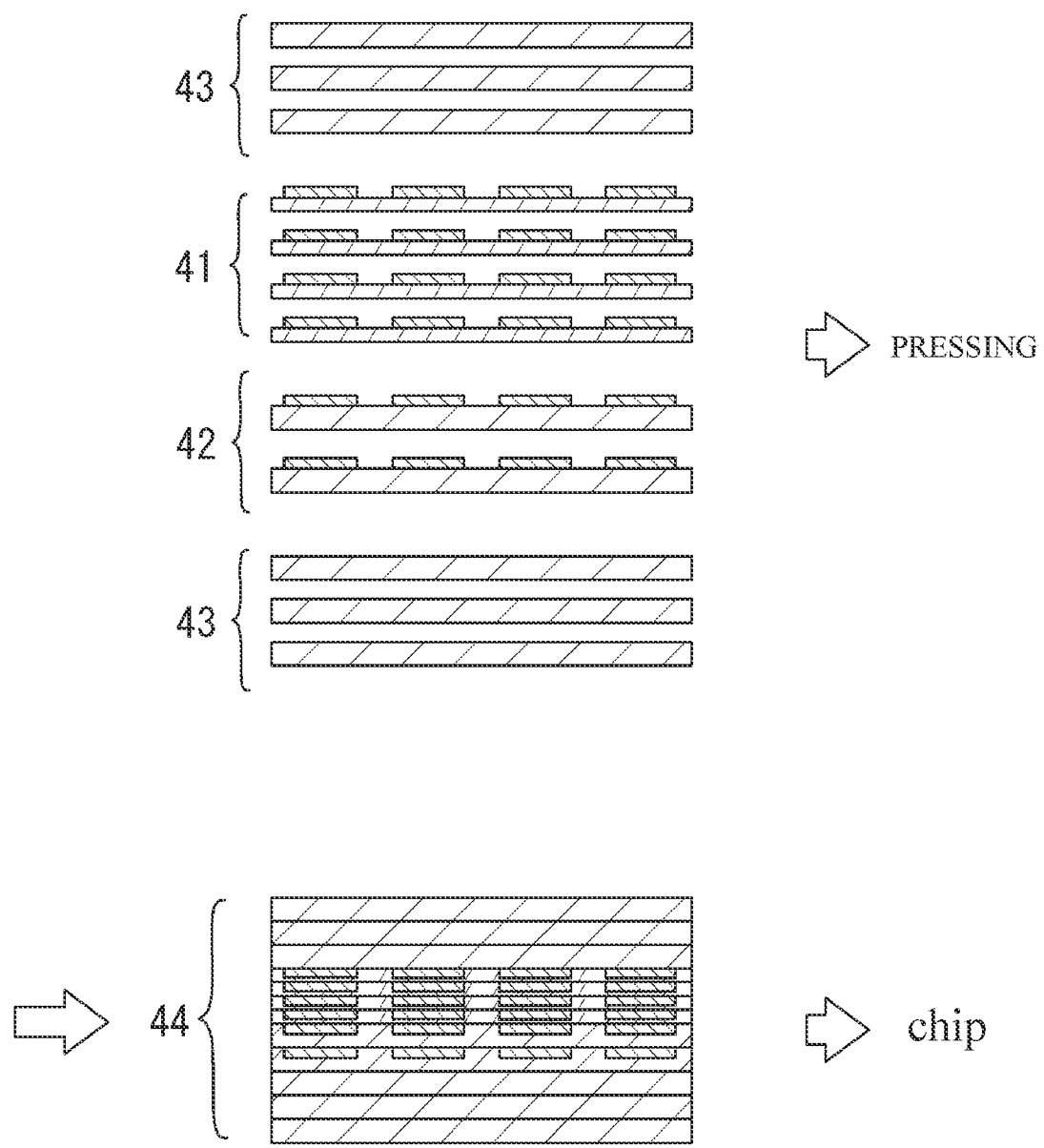
FIG. 8 illustrates a stacking process.

(Packaging process) Next, each of the multilayer ceramic capacitors 100 is packaged in a carrier tape. FIG. 7A illustrates a package body in which each of the multilayer ceramic capacitors 100 is packaged in a carrier tape 70. As illustrated in FIG. 7A, the carrier tape 70 is a type of emboss processing. The carrier tape 70 has a strip-shaped tape main body 71, housing parts 72 provided in the tape main body 71 in a predetermined interval, and sprocket holes 73 having a circle shape. The housing parts 72 have a rectangular parallelepiped shape that is capable of housing the multilayer ceramic capacitor 100. As illustrated in FIG. 7B, each of the multilayer ceramic capacitors 100 is sealed by the housing part 72 and a sealing tape 74. In the manufacturing method of the embodiment, when each of the multilayer ceramic capacitors 100 is housed in the carrier tape 70, it is possible to align the second regions 10d in the housing part 72 so that the second regions 10d are shifted to one of sides of the housing part 72 by confirming the positions of the second regions 10d. It is therefore possible to easily mount the multilayer ceramic capacitors 100 in a desirable direction in the mounting.

In the manufacturing method of the embodiment, the density of the ceramic powder in the dielectric green sheet of the first multilayer structure 41 is larger than that of the ceramic powder in the dielectric green sheet of the second multilayer structure 42. Therefore, in the firing process, the sintering of the ceramic powder in the dielectric green sheet of the second multilayer structure 42 is slower than that of the ceramic powder in the dielectric green sheet of the first multilayer structure 41. Accordingly, the color of the first region 10c acting as the side face of the high capacity section 10a is different from that of the second region 10d acting as the side face of the low capacity section 10b. It is therefore possible to discriminate the up and down of the multilayer ceramic capacitor 100.

First Modified Embodiment

The cover sheets used in the third multilayer structure 43 may be used as the dielectric green sheet in the second multilayer structure 42. For example, as illustrated in FIG.

8, the cover sheet is thicker than the dielectric green sheet in the first multilayer structure 41. The cover sheet is used as the dielectric green sheet in the second multilayer structure 42. When the pressing force in the pressing of the first multilayer structure 41 is larger than that in the pressing of the second multilayer structure 42, the density of the ceramic powder in the dielectric green sheet of the first multilayer structure 41 is larger than that of the ceramic powder in the dielectric green sheet of the second multilayer structure 42.

Second Modified Embodiment

Figure 9:
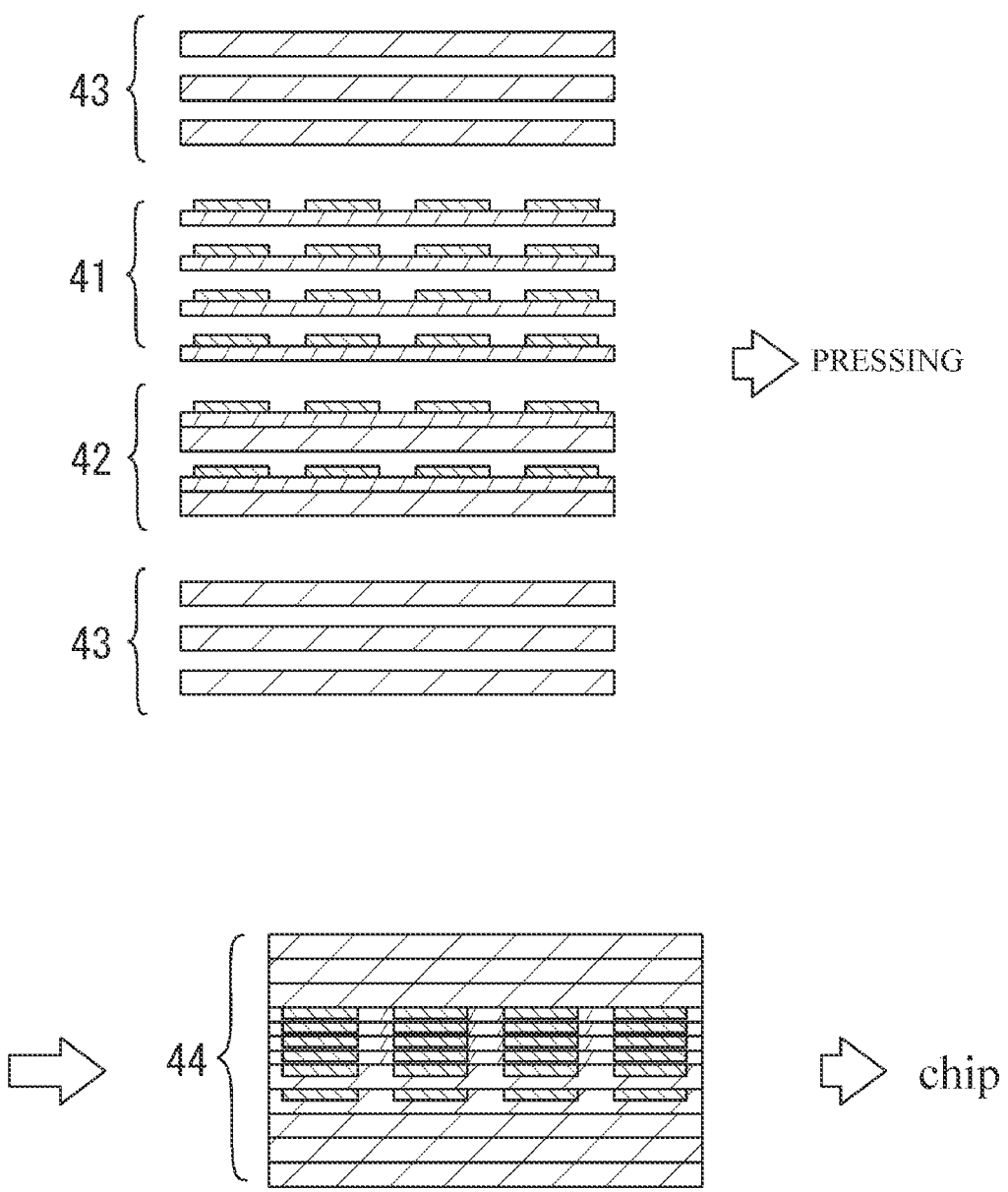
FIG. 9 illustrates a stacking process.

The dielectric green sheet and the cover sheet used in the first multilayer structure 41 may be used as the dielectric green sheet in the second multilayer structure 42. For example, as illustrated in FIG. 9, the dielectric green sheet in the first multilayer structure 41 on which the metal conductive paste for the internal electrode is printed may be stacked on the cover sheet. And, the resulting stacked structure may be used as the dielectric green sheet of the second multilayer structure 42. In this case, before the pressing, the dielectric green sheet corresponding to the low capacity section 10b is thicker than that corresponding to the high capacity section 10a. When the pressing force in the pressing of the first multilayer structure 41 is larger than that in the pressing of the second multilayer structure 42, the density of the ceramic powder in the dielectric green sheet of the first multilayer structure 41 is larger than that of the ceramic powder in the dielectric green sheet of the second multilayer structure 42.

Third Modified Embodiment

The added amount (concentration) of the sintering assistant in the dielectric materials may have a difference. And, delay of sintering may be occurred. For example, the concentration of the sintering assistant in the dielectric green sheet of the first multilayer structure 41 is larger than that of the sintering assistant in the dielectric green sheet of the second multilayer structure 42. In this case, in the firing process, the sintering of the ceramic powder in the dielectric green sheet of the second multilayer structure 42 is slower than that of the ceramic powder in the dielectric green sheet of the first multilayer structure 41. Thus, the color of the first region 10c acting as the side face of the high capacity section 10a is different from that of the second region 10d acting as the side face of the low capacity section 10b. Before the firing, the dielectric green sheet corresponding to the low capacity section 10b is thicker than that corresponding to the high capacity section 10a.

It is possible to use Mg, Mn, V, Si, B or the like, as the sintering assistant. For example, when a plurality of element types are used, it is preferable that a total concentration of the sintering assistants in the dielectric green sheets in the of the first multilayer structure 41 is larger than that in the dielectric green sheets of the second multilayer structure 42.

For example, it is preferable that a Si concentration in the dielectric green sheets of the first multilayer structure 41 is different from that of the dielectric green sheets of the second multilayer structure 42. However, when the difference of the Si concentrations is excessively small, it may be difficult to sufficiently delay the sintering of the ceramic powder of the second multilayer structure 42. And so, it is preferable that a ratio of the Si concentration in the dielectric green sheets of the first multilayer structure 41 with respect to the Si concentration in the dielectric green sheets of the second multilayer structure 42 (Si ratio) has a lower limit.

On the other hand, when the Si ratio is excessively high, a crack may occur because of the sintering kinetics difference. And so, it is preferable that the Si ratio has an upper limit. In the embodiment, it is preferable that the Si ratio is 1.5 or more. It is more preferable that the Si ratio is 2.0 or more. It is still more preferable that the Si ratio is 4.0 or more. It is preferable that the Si ratio is 10.0 or less. It is more preferable that the Si ratio is 8.0 or less. It is still more preferable that the Si ratio is 6.0 or less.

When an absolute amount of Si added to the first multilayer structure 41 is excessively large, an electrostatic capacity of the high capacity section 10a may not be necessarily sufficient. And so, it is preferable that the absolute amount of Si added to the dielectric green sheets of the first multilayer structure 41 has an upper limit. In the embodiment, it is preferable that the Si concentration in the dielectric green sheets of the first multilayer structure 41 is less than 2.5 atm %. It is more preferable that the Si concentration is 2.4 atm % or less. It is still more preferable that the Si concentration is 2.0 atm % or less. For example, it is preferable that the Si concentration in the dielectric green sheets of the first multilayer structure 41 is 0.05 atm % or more and 2.4 atm % or less, and the Si concentration in the dielectric green sheets of the second multilayer structure 42 is 0.03 atm % or more and 0.7 atm % or less.

Alternatively, it is possible to enlarge the sintering kinetics by reducing the concentration of the rare earth element. It is possible to reduce the sintering kinetics by enlarging the concentration of the rare earth element. And so, it is preferable that the total concentration of the rare earth element in the dielectric green sheets of the first multilayer structure 41 is smaller than that in the dielectric green sheets of the second multilayer structure 42. For example, when Ho (holmium) is used as the rare earth element, it is preferable that a Ho concentration in the dielectric layers 11 of the high capacity section 10a is smaller than that in the dielectric layers 11 of the low capacity section 10b.

Alternatively, when a main component of the dielectric layers 11 is a ceramic material having a perovskite structure expressed by a general formula $ABO_3$, it is possible to enlarge the sintering kinetics by replacing the B site of the perovskite structure and reducing the concentration of the element acting as a donor and it is possible to reduce the sintering kinetics by enlarging the concentration of the element acting as the donor. And so, when Mo is used as the element acting as the donor, it is preferable that a Mo concentration in the dielectric green sheets in the first multilayer structure 41 is smaller than that in the dielectric green sheets of the second multilayer structure 42.

In the above-mentioned embodiments, a reverse pattern is not printed on a region on the dielectric green sheet where the pattern for the internal electrode layer is not printed. However, the reverse pattern may be printed on the region. In this case, it is possible to reduce a level difference caused by the pattern for the internal electrode layer. In this case, it is preferable that the density of the ceramic powder in the reverse patter of the first multilayer structure 41 is larger than that of the ceramic powder in the reverse pattern of the second multilayer structure 42. It is preferable that the concentration of the sintering assistant in the reverse pattern of the first multilayer structure 41 is larger than the concentration of the sintering assistant in the reverse pattern of the second multilayer structure 42. It is preferable that the concentration of the rare earth element in the reverse pattern of the first multilayer structure 41 is smaller than that of the rare earth element in the reverse pattern of the second multilayer structure 42. It is preferable that the concentration of the element acting as the donor in the reverse pattern of the first multilayer structure 41 is smaller than that of the element acting as the donor in the reverse pattern of the second multilayer structure 42.

Figure 10A:
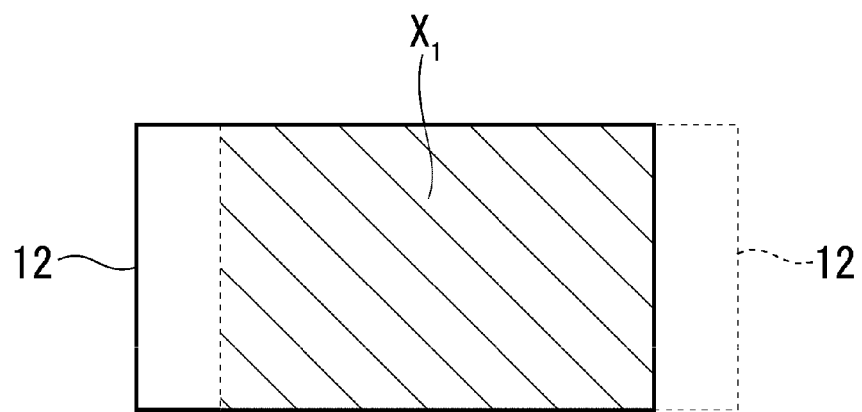
FIG. 10A schematically illustrates a plan view of a facing area of two internal electrode layers in a high capacity section.
Figure 10B:
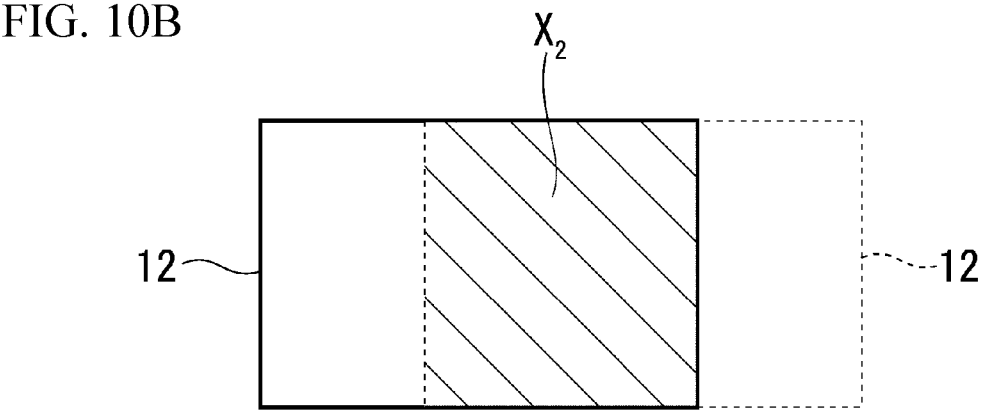
FIG. 10B schematically illustrates a plan view of a facing area of two internal electrode layers in a low capacity section.

In the above-mentioned embodiment, the high capacity section 10a and the low capacity section 10b are provided, by adjusting the thickness of the dielectric layers 11. However, the structure is not limited. For example, a facing area of the two internal electrode layers 12 next to each other may be changed. Thereby, the electrostatic capacity of the high capacity section 10a may be larger than the electrostatic capacity of the low capacity section 10b. FIG. 10A schematically illustrates a plan view of a facing area $X_1$ of the two internal electrode layers 12 in the high capacity section 10a. FIG. 10B schematically illustrates a plan view of a facing area $X_2$ of the two internal electrode layers 12 in the low capacity section 10b. FIG. 10A and FIG. 10B schematically illustrate plan views of the facing area of the internal electrode layers 12. As illustrated in FIG. 10A and FIG. 10B, the facing area $X_1$ is larger than the facing area $X_2$. Thereby, the electrostatic capacity of the high capacity section 10a is larger than the second electrostatic capacity of the low capacity section 10b even if the thickness of the dielectric layers 11 of the high capacity section 10a is the same as that of the dielectric layers 11 of the low capacity section 10b.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

Necessary additive was added to barium titanate powder. And, the additive and the barium titanate were sufficiently wet-blended and crushed in a ball mill. Thus, the dielectric material was obtained. The additive included Mg, Mn, V and Si as a sintering assistant. The additive included Ho as a rare earth element. The concentrations of Ho, Mg, Mn and V were 0.5 atm %, 0.5 atm %, 0.1 atm % and 0.1 atm %, on a presumption that the concentration of Ti of the barium titanate was 100 atm %.

In the example 1, the Si ratio was 1.5. In the example 1-1, the Si concentration in the second multilayer structure 42 was 0.03 atm %, and the Si concentration in the first multilayer structure 41 was 0.045 atm %. In the example 1-2, the Si concentration in the second multilayer structure 42 was 0.05 atm %, and the Si concentration in the first multilayer structure 41 was 0.075 atm %. In the example 1-3, the Si concentration in the second multilayer structure 42 was 0.10 atm %, and the Si concentration in the first multilayer structure 41 was 0.150 atm %. In the example 1-4, the Si concentration in the second multilayer structure 42 was 0.20 atm %, and the Si concentration in the first multilayer structure 41 was 0.300 atm %. In the example 1-5, the Si concentration in the second multilayer structure 42 was 0.30 atm %, and the Si concentration in the first multilayer structure 41 was 0.450 atm %. In the example 1-6, the Si concentration in the second multilayer structure 42 was 0.40 atm %, and the Si concentration in the first multilayer structure 41 was 0.600 atm %. In the example 1-7, the Si concentration in the second multilayer structure 42 was 0.50 atm %, and the Si concentration in the first multilayer structure 41 was 0.750 atm %. In the example 1-8, the Si concentration in the second multilayer structure 42 was 0.60 atm %, and the Si concentration in the first multilayer structure 41 was 0.900 atm %. In the example 1-9, the Si concentration in the second multilayer structure 42 was 0.70 atm %, and the Si concentration in the first multilayer structure 41 was 1.050 atm %.

In the example 2, the Si ratio was 2.0. In the example 2-1, the Si concentration in the second multilayer structure 42 was 0.03 atm %, and the Si concentration in the first multilayer structure 41 was 0.060 atm %. In the example 2-2, the Si concentration in the second multilayer structure 42 was 0.05 atm %, and the Si concentration in the first multilayer structure 41 was 0.100 atm %. In the example 2-3, the Si concentration in the second multilayer structure 42 was 0.10 atm %, and the Si concentration in the first multilayer structure 41 was 0.200 atm %. In the example 2-4, the Si concentration in the second multilayer structure 42 was 0.20 atm %, and the Si concentration in the first multilayer structure 41 was 0.400 atm %. In the example 2-5, the Si concentration in the second multilayer structure 42 was 0.30 atm %, and the Si concentration in the first multilayer structure 41 was 0.600 atm %. In the example 2-6, the Si concentration in the second multilayer structure 42 was 0.40 atm %, and the Si concentration in the first multilayer structure 41 was 0.800 atm %. In the example 2-7, the Si concentration in the second multilayer structure 42 was 0.50 atm %, and the Si concentration in the first multilayer structure 41 was 1.000 atm %. In the example 2-8, the Si concentration in the second multilayer structure 42 was 0.60 atm %, and the Si concentration in the first multilayer structure 41 was 1.200 atm %. In the example 2-9, the Si concentration in the second multilayer structure 42 was 0.70 atm %, and the Si concentration in the first multilayer structure 41 was 1.400 atm %.

In the example 3, the Si ratio was 3.0. In the example 3-1, the Si concentration in the second multilayer structure 42 was 0.03 atm %, and the Si concentration in the first multilayer structure 41 was 0.090 atm %. In the example 3-2, the Si concentration in the second multilayer structure 42 was 0.05 atm %, and the Si concentration in the first multilayer structure 41 was 0.150 atm %. In the example 3-3, the Si concentration in the second multilayer structure 42 was 0.10 atm %, and the Si concentration in the first multilayer structure 41 was 0.300 atm %. In the example 3-4, the Si concentration in the second multilayer structure 42 was 0.20 atm %, and the Si concentration in the first multilayer structure 41 was 0.600 atm %. In the example 3-5, the Si concentration in the second multilayer structure 42 was 0.30 atm %, and the Si concentration in the first multilayer structure 41 was 0.900 atm %. In the example 3-6, the Si concentration in the second multilayer structure 42 was 0.40 atm %, and the Si concentration in the first multilayer structure 41 was 1.200 atm %. In the example 3-7, the Si concentration in the second multilayer structure 42 was 0.50 atm %, and the Si concentration in the first multilayer structure 41 was 1.500 atm %. In the example 3-8, the Si concentration in the second multilayer structure 42 was 0.60 atm %, and the Si concentration in the first multilayer structure 41 was 1.800 atm %. In the example 3-9, the Si concentration in the second multilayer structure 42 was 0.70 atm %, and the Si concentration in the first multilayer structure 41 was 2.100 atm %.

In the example 4, the Si ratio was 4.0. In the example 4-1, the Si concentration in the second multilayer structure 42 was 0.03 atm %, and the Si concentration in the first multilayer structure 41 was 0.120 atm %. In the example 4-2, the Si concentration in the second multilayer structure 42 was 0.05 atm %, and the Si concentration in the first multilayer structure 41 was 0.200 atm %. In the example 4-3, the Si concentration in the second multilayer structure 42 was 0.10 atm %, and the Si concentration in the first multilayer structure 41 was 0.400 atm %. In the example 4-4, the Si concentration in the second multilayer structure 42 was 0.20 atm %, and the Si concentration in the first multilayer structure 41 was 0.800 atm %. In the example 4-5, the Si concentration in the second multilayer structure 42 was 0.30 atm %, and the Si concentration in the first multilayer structure 41 was 1.200 atm %. In the example 4-6, the Si concentration in the second multilayer structure 42 was 0.40 atm %, and the Si concentration in the first multilayer structure 41 was 1.600 atm %. In the example 4-7, the Si concentration in the second multilayer structure 42 was 0.50 atm %, and the Si concentration in the first multilayer structure 41 was 2.000 atm %. In the example 4-8, the Si concentration in the second multilayer structure 42 was 0.60 atm %, and the Si concentration in the first multilayer structure 41 was 2.400 atm %. In the example 4-9, the Si concentration in the second multilayer structure 42 was 0.70 atm %, and the Si concentration in the first multilayer structure 41 was 2.800 atm %.

In the example 5, the Si ratio was 5.0. In the example 5-1, the Si concentration in the second multilayer structure 42 was 0.03 atm %, and the Si concentration in the first multilayer structure 41 was 0.150 atm %. In the example 5-2, the Si concentration in the second multilayer structure 42 was 0.05 atm %, and the Si concentration in the first multilayer structure 41 was 0.250 atm %. In the example 5-3, the Si concentration in the second multilayer structure 42 was 0.10 atm %, and the Si concentration in the first multilayer structure 41 was 0.500 atm %. In the example 5-4, the Si concentration in the second multilayer structure 42 was 0.20 atm %, and the Si concentration in the first multilayer structure 41 was 1.000 atm %. In the example 5-5, the Si concentration in the second multilayer structure 42 was 0.30 atm %, and the Si concentration in the first multilayer structure 41 was 1.500 atm %. In the example 5-6, the Si concentration in the second multilayer structure 42 was 0.40 atm %, and the Si concentration in the first multilayer structure 41 was 2.000 atm %. In the example 5-7, the Si concentration in the second multilayer structure 42 was 0.50 atm %, and the Si concentration in the first multilayer structure 41 was 2.500 atm %. In the example 5-8, the Si concentration in the second multilayer structure 42 was 0.60 atm %, and the Si concentration in the first multilayer structure 41 was 3.000 atm %.

In the example 6, the Si ratio was 6.0. In the example 6-1, the Si concentration in the second multilayer structure 42 was 0.03 atm %, and the Si concentration in the first multilayer structure 41 was 0.180 atm %. In the example 6-2, the Si concentration in the second multilayer structure 42 was 0.05 atm %, and the Si concentration in the first multilayer structure 41 was 0.300 atm %. In the example 6-3, the Si concentration in the second multilayer structure 42 was 0.10 atm %, and the Si concentration in the first multilayer structure 41 was 0.600 atm %. In the example 6-4, the Si concentration in the second multilayer structure 42 was 0.20 atm %, and the Si concentration in the first multilayer structure 41 was 1.200 atm %. In the example 6-5, the Si concentration in the second multilayer structure 42 was 0.30 atm %, and the Si concentration in the first multilayer structure 41 was 1.800 atm %. In the example 6-6, the Si concentration in the second multilayer structure 42 was 0.40 atm %, and the Si concentration in the first multilayer structure 41 was 2.400 atm %. In the example 6-7, the Si concentration in the second multilayer structure 42 was 0.50 atm %, and the Si concentration in the first multilayer structure 41 was 3.000 atm %. In the example 6-8, the Si concentration in the second multilayer structure 42 was 0.60 atm %, and the Si concentration in the first multilayer structure 41 was 3.600 atm %.

In the example 7, the Si ratio was 7.0. In the example 7-1, the Si concentration in the second multilayer structure 42 was 0.03 atm %, and the Si concentration in the first multilayer structure 41 was 0.210 atm %. In the example 7-2, the Si concentration in the second multilayer structure 42 was 0.05 atm %, and the Si concentration in the first multilayer structure 41 was 0.350 atm %. In the example 7-3, the Si concentration in the second multilayer structure 42 was 0.10 atm %, and the Si concentration in the first multilayer structure 41 was 0.700 atm %. In the example 7-4, the Si concentration in the second multilayer structure 42 was 0.20 atm %, and the Si concentration in the first multilayer structure 41 was 1.400 atm %. In the example 7-5, the Si concentration in the second multilayer structure 42 was 0.30 atm %, and the Si concentration in the first multilayer structure 41 was 2.100 atm %. In the example 7-6, the Si concentration in the second multilayer structure 42 was 0.40 atm %, and the Si concentration in the first multilayer structure 41 was 2.800 atm %. In the example 7-7, the Si concentration in the second multilayer structure 42 was 0.50 atm %, and the Si concentration in the first multilayer structure 41 was 3.500 atm %.

In the example 8, the Si ratio was 8.0. In the example 8-1, the Si concentration in the second multilayer structure 42 was 0.03 atm %, and the Si concentration in the first multilayer structure 41 was 0.240 atm %. In the example 8-2, the Si concentration in the second multilayer structure 42 was 0.05 atm %, and the Si concentration in the first multilayer structure 41 was 0.400 atm %. In the example 8-3, the Si concentration in the second multilayer structure 42 was 0.10 atm %, and the Si concentration in the first multilayer structure 41 was 0.800 atm %. In the example 8-4, the Si concentration in the second multilayer structure 42 was 0.20 atm %, and the Si concentration in the first multilayer structure 41 was 1.600 atm %. In the example 8-5, the Si concentration in the second multilayer structure 42 was 0.30 atm %, and the Si concentration in the first multilayer structure 41 was 2.400 atm %. In the example 8-6, the Si concentration in the second multilayer structure 42 was 0.40 atm %, and the Si concentration in the first multilayer structure 41 was 3.200 atm %. In the example 8-7, the Si concentration in the second multilayer structure 42 was 0.50 atm %, and the Si concentration in the first multilayer structure 41 was 4.000 atm %.

In the example 9, the Si ratio was 9.0. In the example 9-1, the Si concentration in the second multilayer structure 42 was 0.03 atm %, and the Si concentration in the first multilayer structure 41 was 0.270 atm %. In the example 9-2, the Si concentration in the second multilayer structure 42 was 0.05 atm %, and the Si concentration in the first multilayer structure 41 was 0.450 atm %. In the example 9-3, the Si concentration in the second multilayer structure 42 was 0.10 atm %, and the Si concentration in the first multilayer structure 41 was 0.900 atm %. In the example 9-4, the Si concentration in the second multilayer structure 42 was 0.20 atm %, and the Si concentration in the first multilayer structure 41 was 1.800 atm %. In the example 9-5, the Si concentration in the second multilayer structure 42 was 0.30 atm %, and the Si concentration in the first multilayer structure 41 was 2.700 atm %. In the example 9-6, the Si concentration in the second multilayer structure 42 was 0.40 atm %, and the Si concentration in the first multilayer structure 41 was 3.600 atm %.

In the example 10, the Si ratio was 10.0. In the example 10-1, the Si concentration in the second multilayer structure 42 was 0.03 atm %, and the Si concentration in the first multilayer structure 41 was 0.300 atm %. In the example 10-2, the Si concentration in the second multilayer structure 42 was 0.05 atm %, and the Si concentration in the first multilayer structure 41 was 0.500 atm %. In the example 10-3, the Si concentration in the second multilayer structure 42 was 0.10 atm %, and the Si concentration in the first multilayer structure 41 was 1.000 atm %. In the example 10-4, the Si concentration in the second multilayer structure 42 was 0.20 atm %, and the Si concentration in the first multilayer structure 41 was 2.000 atm %. In the example 10-5, the Si concentration in the second multilayer structure 42 was 0.30 atm %, and the Si concentration in the first multilayer structure 41 was 3.000 atm %. In the example 10-6, the Si concentration in the second multilayer structure 42 was 0.40 atm %, and the Si concentration in the first multilayer structure 41 was 4.000 atm %.

Table 1 show these Si concentrations.

TABLE 1

| No. | Si CONCENTRATION OF LOW CAPACITY REGION [atm %] | EXAMPLE |||||||||| 
|---|---|---|---|---|---|---|---|---|---|---|
| | | 1 | 2 | 3 | 4 | 5 | 6 | 7 | 8 | 9 | 10 |
| | | Si RATIO |||||||||| 
| | | 1.5 | 2 | 3 | 4 | 5 | 6 | 7 | 8 | 9 | 10 |
| | | Si CONCENTRATION OF HIGH CAPACITY REGION [atm %] |||||||||| 
| 1 | 0.03 | 0.045 | 0.060 | 0.090 | 0.120 | 0.150 | 0.180 | 0.210 | 0.240 | 0.270 | 0.300 |
| 2 | 0.05 | 0.075 | 0.100 | 0.150 | 0.200 | 0.250 | 0.300 | 0.350 | 0.400 | 0.450 | 0.500 |
| 3 | 0.10 | 0.150 | 0.200 | 0.300 | 0.400 | 0.500 | 0.600 | 0.700 | 0.800 | 0.900 | 1.000 |
| 4 | 0.20 | 0.300 | 0.400 | 0.600 | 0.800 | 1.000 | 1.200 | 1.400 | 1.600 | 1.800 | 2.000 |
| 5 | 0.30 | 0.450 | 0.600 | 0.900 | 1.200 | 1.500 | 1.800 | 2.100 | 2.400 | 2.700 | 3.000 |
| 6 | 0.40 | 0.600 | 0.800 | 1.200 | 1.600 | 2.000 | 2.400 | 2.800 | 3.200 | 3.600 | 4.000 |
| 7 | 0.50 | 0.750 | 1.000 | 1.500 | 2.000 | 2.500 | 3.000 | 3.500 | 4.000 | — | — |
| 8 | 0.60 | 0.900 | 1.200 | 1.800 | 2.400 | 3.000 | 3.600 | — | — | — | — |
| 9 | 0.70 | 1.050 | 1.400 | 2.100 | 2.800 | — | — | — | — | — | — |

An organic binder and a solvent were added to the dielectric material. And dielectric green sheets were made by a doctor blade method. The organic binder was polyvinyl butyral (PVB) resin or the like. The solvent was ethanol, toluene or the like. And a plasticizer and so on were added. Next, the conductive paste for forming the internal electrode layer 12 was formed. The conductive paste included a main component metal powder of the internal electrode layer 12, a binder, a solvent and an auxiliary as needed. The organic binder and the solvent of the conductive paste for forming the internal electrode layer are different from those of the dielectric green sheet. The conductive paste for forming the internal electrode layer was screen-printed on the dielectric green sheet. A plurality of the dielectric green sheets on which the conductive paste for forming the internal electrode layer was printed were stacked. In this case, in the region corresponding to the low capacity section 10b, the cover sheet was inserted under the dielectric green sheet. The third multilayer structure 43 of a plurality of cover sheets were stacked on the stacked dielectric green sheets and under the stacked dielectric green sheets. After that, the ceramic multilayer structure 44 was obtained by a thermal compressing. And the ceramic multilayer structure 44 was cut into a predetermined size.

The binder was removed from the ceramic multilayer structure 44 in $N_2$ atmosphere. After that, the metal paste including the metal filler of which a main component was Ni, the co-material, the binder and the solvent was coated from the both edge faces to the side faces of the ceramic multilayer structure 44 and was dried. After that, the resulting ceramic multilayer structure 44 was fired together with the metal paste in a reductive atmosphere a temperature range of 1100 degrees C. to 1300 degrees C. And, a sintered structure was formed.

The sintered structure was subjected to a re-oxidation process at 800 degrees C. in $N_2$ atmosphere. After that, by a electroplating process, a Cu-plated layer, a Ni-plated layer and a Sn-plated layer were formed on the surface of the external electrodes 20a and 20b. Thus the multilayer ceramic capacitor 100 was formed. The number of the dielectric layers 11 of the high capacity section 10a was 300. The thickness of the dielectric layers 11 of the high capacity section 10a was 1.5 μm. The number of the dielectric layers 11 of the low capacity section 10b was 20. The thickness of the dielectric layers of the low capacity section 10b was 10 μm. The resulting multilayer ceramic capacitor 100 had a length of 1.6 mm, a width of 0.8 mm and a height of 0.9 mm.

500 samples were made, with respect to the examples 1-1 to 1-9, the examples 2-1 to 2-9, the examples 3-1 to 3-9, the examples 4-1 to 4-9, the examples 5-1 to 5-8, the examples 6-1 to 6-8, the examples 7-1 to 7-7, the examples 8-1 to 8-7, the examples 9-1 to 9-6 and the examples 10-1 to 10-6.

(Analysis) With respect to each sample, it was confirmed whether the color of the high capacity section 10a and the color of the low capacity section 10b on the side face of the multilayer chip 10 could be discriminated. When the color of the high capacity section 10a and the color of the low capacity section 10b of a sample could be visually discriminated, the samples was determined as good "discriminable". When the color of the high capacity section 10a and the color of the low capacity section 10b of a sample could not be visually discriminated, the samples was determined as bad "not discriminable". Table 2 shows the results. As shown in Table 2, a rate of "discriminable" was 100% with respect to the examples 1-1 to 1-9, the examples 2-1 to 2-9, the examples 3-1 to 3-9, the examples 4-1 to 4-9, the examples 5-1 to 5-8, the examples 6-1 to 6-8, the examples 7-1 to 7-7, the examples 8-1 to 8-7, the examples 9-1 to 9-6 and the examples 10-1 to 10-6. It is thought that this was because the sintering of the low capacity section delayed, because the amount of the sintering assistant in the low capacity section was smaller than that in the high capacity section.

TABLE 2

| EXAMPLES 1-1~1-9 | DISCRIMINABLE |
|---|---|
| EXAMPLES 2-1~2-9 | DISCRIMINABLE |
| EXAMPLES 3-1~3-9 | DISCRIMINABLE |
| EXAMPLES 4-1~4-9 | DISCRIMINABLE |
| EXAMPLES 5-1~5-8 | DISCRIMINABLE |
| EXAMPLES 6-1~6-8 | DISCRIMINABLE |
| EXAMPLES 7-1~7-7 | DISCRIMINABLE |
| EXAMPLES 8-1~8-7 | DISCRIMINABLE |
| EXAMPLES 9-1~9-6 | DISCRIMINABLE |
| EXAMPLES 10-1~10-6 | DISCRIMINABLE |

With respect to each sample, it was determined whether a crack occurred or not. And, a ratio of samples in which a crack occurred with respect to 500 samples was measured (hereinafter referred to as a crack occurrence rate). In concrete, each sample was subjected to a heat cycle test. In the heat cycle test, 100 cycles were performed. In one cycle, the temperature of the sample was kept at 125 degrees C. for 30 minutes, and after that, the temperature of the sample was kept at −40 degrees C. for 30 minutes. After that, it was determined whether a crack occurred in the sample, with use of a stereomicroscope. Table 3 shows the results. As shown in Table 3, the crack occurrence rate was 2/500 or more with respect to the example 1 in which the Si ratio was 1.5. The crack occurrence rate was 1/500 with respect to the example 2 in which the Si ratio was 2.0 and the example 3 in which the Si ratio was 3.0. The crack occurrence rate was 0/500 with respect to the examples 4 to 10 in which the Si ratio was 4.0 or more. From the results, it is preferable that the Si ratio is 2.0 or more. And it is more preferable that the Si ratio was 4.0 or more.

TABLE 3

| | CRACK OCCURRENCE RATE |
|---|---|
| EXAMPLE 1 | 2/500 OR MORE |
| EXAMPLE 2 | 1/500 |
| EXAMPLE 3 | 1/500 |
| EXAMPLE 4 | 0/500 |
| EXAMPLE 5 | 0/500 |
| EXAMPLE 6 | 0/500 |
| EXAMPLE 7 | 0/500 |
| EXAMPLE 8 | 0/500 |
| EXAMPLE 9 | 0/500 |
| EXAMPLE 10 | 0/500 |

Next, the electrostatic capacity was measured. When the electrostatic capacity of a sample was larger than a designed capacity or a lack of the electrostatic capacity of the sample with respect to the designed capacity was less than 5%, the sample was determined as good "○". When the lack of the electrostatic capacity of the sample with respect to the designed capacity was 5% or more, the sample was determined as so-so "Δ". Table 4 shows the results. As shown in Table 4, when the Si concentration of samples was less than 2.5 atm % in the high capacity section (examples 1-1 to 1-9, the examples 2-1 to 2-9, the examples 3-1 to 3-9, the examples 4-1 to 4-8, the examples 5-1 to 5-6, the examples 6-1 to 6-6, the examples 7-1 to 7-5, the examples 8-1 to 8-5, the examples 9-1 to 9-4, and the examples 10-1 to 10-4), the samples were determined as good "○". When the Si concentration of samples was 2.5 atm % or more in the high capacity section (example 4-9, the examples 5-7 to 5-8, the examples 6-7 to 6-8, the examples 7-6 to 7-7, the examples 8-6 to 8-7, the examples 9-5 to 9-6 and the examples 10-5 to 10-6), the samples were determined as so-so "Δ". From the results, it is preferable that the Si concentration of the high capacity section is less than 2.5 atm %.

TABLE 4

| EXAMPLES 1-1~1-9 | ○ |
|---|---|
| EXAMPLES 2-1~2-9 | ○ |
| EXAMPLES 3-1~3-9 | ○ |
| EXAMPLES 4-1~4-8 | ○ |
| EXAMPLE 4-9 | Δ |
| EXAMPLES 5-1~5-6 | ○ |
| EXAMPLES 5-7~5-8 | Δ |
| EXAMPLES 6-1~6-6 | ○ |
| EXAMPLES 6-7~6-8 | Δ |
| EXAMPLES 7-1~7-5 | ○ |
| EXAMPLES 7-6~7-7 | Δ |
| EXAMPLES 8-1~8-5 | ○ |
| EXAMPLES 8-6~8-7 | Δ |
| EXAMPLES 9-1~9-4 | ○ |
| EXAMPLES 9-5~9-6 | Δ |
| EXAMPLES 10-1~10-4 | ○ |
| EXAMPLES 10-5~10-6 | Δ |

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer chip having a multilayer structure and a pair of cover layers, the multilayer structure having a structure in which each of a plurality of dielectric layers and each of a plurality of internal electrode layers are alternately stacked, a main component of the dielectric layers being ceramic, the multilayer structure having a rectangular parallelepiped shape, respective one ends of the plurality of internal electrode layers being alternately exposed to a first end face and a second end face of the multilayer structure, the first end face being opposite to the second end face, the pair of cover layers being respectively provided on an upper face and a lower face of the multilayer structure in a stacking direction of the multilayer structure, a main component of the cover layers being ceramic,
a first external electrode provided on the first end face; and
a second external electrode provided on the second end face,
wherein each of two side faces of the multilayer structure has a first region and a second region that are positioned at different heights from each other in the stacking direction, and a color of the first region is different from a color of the second region,
wherein the multilayer structure includes a high capacity section and a low capacity section that are disposed at different heights from each other in the stacking direction,
wherein the first region of each of the two side faces of the multilayer structure corresponds to a side face of the high capacity section, and
wherein the second region of each of the two side faces of the multilayer structure corresponds to a side face of the low capacity section.

2. The ceramic electronic device as claimed in claim 1, wherein each dielectric layer in the low capacity section is thicker than each dielectric layer in the high capacity section.

3. The ceramic electronic device as claimed in claim 2, wherein each dielectric layer in the low capacity section is three times as thick as each dielectric layer in the high capacity section or more.

4. The ceramic electronic device as claimed in claim 1, wherein a concentration of a sintering assistant in each dielectric layer in the high capacity section is larger than that of a sintering assistant in each dielectric layer in the low capacity section.

5. The ceramic electronic device as claimed in claim 4, wherein the sintering assistant includes Si,
wherein a Si concentration in each dielectric layer in the high capacity section is 1.5 times as much as a Si concentration in each dielectric layer in the low capacity section or more, and is 10 times as much as the Si concentration in each dielectric layer in the low capacity section or less.

6. The ceramic electronic device as claimed in claim 1, wherein a concentration of a rare earth element in each dielectric layer in the high capacity section is smaller than that of the rare earth element in each dielectric layer in the low capacity section.

7. The ceramic electronic device as claimed in claim 1, wherein a concentration of an element acting as a donor in the low capacity section is smaller than that of an element acting as a donor in the high capacity section.

8. A mounting substrate comprising:
the ceramic electronic device that is claimed in claim 1 and is mounted on the mounting substrate,
wherein the second region is closer to the mounting substrate than the first region.

9. A package body comprising:
the ceramic electronic devices as claimed in claim 1 provided in a plurality; and
a carrier tape having housing portions in which the plurality of the ceramic electronic devices are respectively housed,
wherein the plurality of the ceramic electronic devices are respectively housed in the housing portions so that the respective second regions are positioned at respective biased positions in the housing portions.

10. A manufacturing method of a ceramic electronic device comprising:
forming a ceramic multilayer structure in which each of a plurality of green sheets and each of a plurality of metal conductive paste patterns are alternately stacked, the green sheets including ceramic powder, respective one ends of the plurality of metal conductive paste patterns being alternately exposed to a first end face and a second end face of the ceramic multilayer structure; and
firing the ceramic multilayer structure,
wherein the ceramic multilayer structure includes a first multilayer structure and a second multilayer structure, where each green sheet in the first multilayer structure is thinner than each green sheet in the second multilayer structure,
wherein a density of the ceramic powder throughout an entirety of each green sheet in the first multilayer structure is larger than a density of the ceramic powder throughout an entirety of each green sheet in the second multilayer structure.

11. A manufacturing method of a ceramic electronic device comprising:
forming a ceramic multilayer structure in which each of a plurality of green sheets and each of a plurality of metal conductive paste patterns are alternately stacked, the green sheets including ceramic powder, respective one ends of the plurality of metal conductive paste patterns being alternately exposed to a first end face and a second end face of the ceramic multilayer structure; and
firing the ceramic multilayer structure,
wherein the ceramic multilayer structure includes a first multilayer structure and a second multilayer structure, where each green sheet in the first multilayer structure is thinner than each green sheet in the second multilayer structure,
wherein a concentration of a sintering assistant in each green sheet in the first multilayer structure is larger than a concentration of a sintering assistant in each green sheet in the second multilayer structure.

12. The method as claimed in claim 11,
wherein the sintering assistant includes Si,
wherein a Si concentration in each green sheet in the first multilayer structure is 1.5 times as much as a Si concentration in each green sheet in the second multilayer structure or more, and is 10 times as much as the Si concentration in each green sheet of the second multilayer structure or less.

13. The method as claimed in claim 11, wherein a concentration of a rare earth element in each green sheet in the first multilayer structure is smaller than a concentration of a rare earth element in each green sheet in the second multilayer structure.

* * * * *